(12) United States Patent
Wu (10) Patent No.: US 8,702,319 B2
(45) Date of Patent: Apr. 22, 2014

(54) CABLE ASSEMBLY ADAPTED FOR OPTICAL TRANSMITTING

(75) Inventor: Jerry Wu, Irvine, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 264 days.

(21) Appl. No.: 13/237,982

(22) Filed: Sep. 21, 2011

(65) Prior Publication Data

US 2012/0076462 A1 Mar. 29, 2012

(30) Foreign Application Priority Data

Sep. 23, 2010 (CN) .......................... 2010 2 0539760

(51) Int. Cl.
*G02B 6/36* (2006.01)

(52) U.S. Cl.
USPC ......................................................... 385/75

(58) Field of Classification Search
None
See application file for complete search history.

(56) References Cited

U.S. PATENT DOCUMENTS

| 5,109,452 A * | 4/1992 | Selvin et al. ..................... 385/69 |
| 6,456,768 B1 * | 9/2002 | Boncek et al. ................. 385/100 |
| 7,572,071 B1 * | 8/2009 | Wu .................................. 385/94 |
| 7,717,733 B1 * | 5/2010 | Yi et al. ......................... 439/452 |
| 8,449,205 B2 * | 5/2013 | Little et al. ....................... 385/93 |
| 2010/0124395 A1 * | 5/2010 | Lin et al. .......................... 385/76 |
| 2010/0158448 A1 * | 6/2010 | Yi et al. ........................... 385/74 |
| 2011/0194823 A1 * | 8/2011 | Wu .................................. 385/92 |
| 2011/0249948 A1 * | 10/2011 | Wu .................................. 385/89 |
| 2011/0255825 A1 * | 10/2011 | Ko et al. .......................... 385/15 |
| 2012/0002930 A1 * | 1/2012 | Lin et al. ....................... 385/101 |

FOREIGN PATENT DOCUMENTS

CN 101345358 1/2009

* cited by examiner

*Primary Examiner* — Mike Stahl
(74) *Attorney, Agent, or Firm* — Wei Te Chung; Ming Chieh Chang (57) ABSTRACT

A cable assembly (1000) includes an insulative housing (1); a terminal module (22) assembled to the insulative housing, the terminal module including a plurality of terminals (222) combined with an insulator (221); at least one lens (81) supported by the insulative housing; a cable (6) having a plurality of wires (61, 62), a fiber (65) and a strength member (66), the wires electrically connected to the terminals, the fiber optically coupled with the lens; and an anchoring member (9) having a holding portion (91) combined with the strength member (66) and a locking portion (92) engaged with the terminal module.

17 Claims, 8 Drawing Sheets

CABLE ASSEMBLY ADAPTED FOR OPTICAL TRANSMITTING

FIELD OF THE INVENTION

The present invention generally relates to a cable assembly, and more particularly to a cable assembly for optical transmitting.

DESCRIPTION OF PRIOR ART

With development of interconnection technique, a wide range of electrical connector assemblies in accordance with USB, SATA, HDMI, SAS and Displayport transmitting protocol have been widely applied in different kinds of electronic devices. The aforementioned connector assemblies depend on metallic terminals and copper wires to achieve electrical signal transmitting. However, transmitting speed is limited via electrical signal transmitting. In other aspect, with transmitting speed increasing, a structure of the connector assembly becomes complex, and a total dimension of the cable assembly is increasing.

CN Pub. Pat. No. 101345358 published on Jan. 14, 2009 discloses an optical USB connector assembly which has a fiber device added to a USB connector assembly. The connector assembly includes a USB connector with a fiber device for transmitting electrical and optical signal. The fiber device has a number of fibers connected with lenses directly embedded in a housing of the USB connector. However, as the fibers are delicate and broken off when they are pulled excessively.

Hence, an improved cable assembly is highly desired to overcome the aforementioned problems.

SUMMARY OF THE INVENTION

Accordingly, an object of the present invention is to provide a cable assembly having strength relief means and enduring big pulling force.

In order to achieve the object set forth, a cable assembly in accordance with the present invention comprises an insulative housing; a terminal module assembled to the insulative housing, the terminal module including a plurality of terminals combined with an insulator; at least one lens supported by the insulative housing; a cable having a plurality of wires, a fiber and a strength member, the wires electrically connected to the terminals, the fiber optically coupled with the lens; and an anchoring member having a holding portion combined with the strength member and a locking portion engaged with the terminal module.

Other objects, advantages and novel features of the invention will become more apparent from the following detailed description when taken in conjunction with the accompanying drawings.

DETAILED DESCRIPTION OF PREFERRED EMBODIMENTS

Reference will now be made in detail to the preferred embodiment of the present invention.

Referring to FIGS. 1-8, the cable assembly 1000 for electrical and optical transmitting in accordance with the present invention comprises an insulative housing 1, a terminal module (not labled) supported by the insulative housing 1, two latching members 3 mounted to the insulative housing 1, a metallic shell 4 shielding the insulative housing 1, an external cover 5, a cable 6, a strain relief 7, an optical module 8 and an anchoring member 9.

Figure 1:
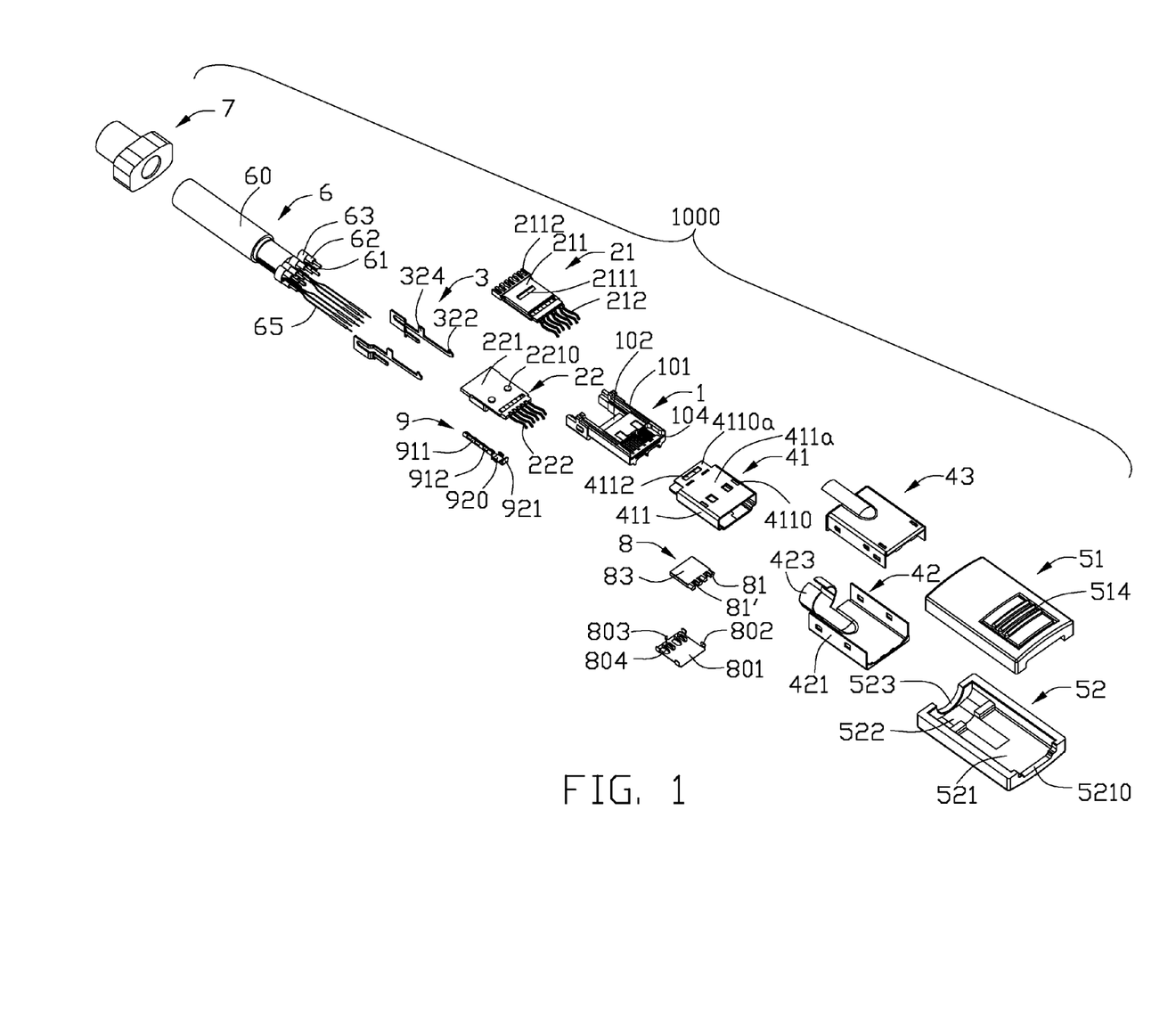
FIG. 1 is an exploded, perspective view of a cable assembly in accordance with the present invention.
Figure 2:
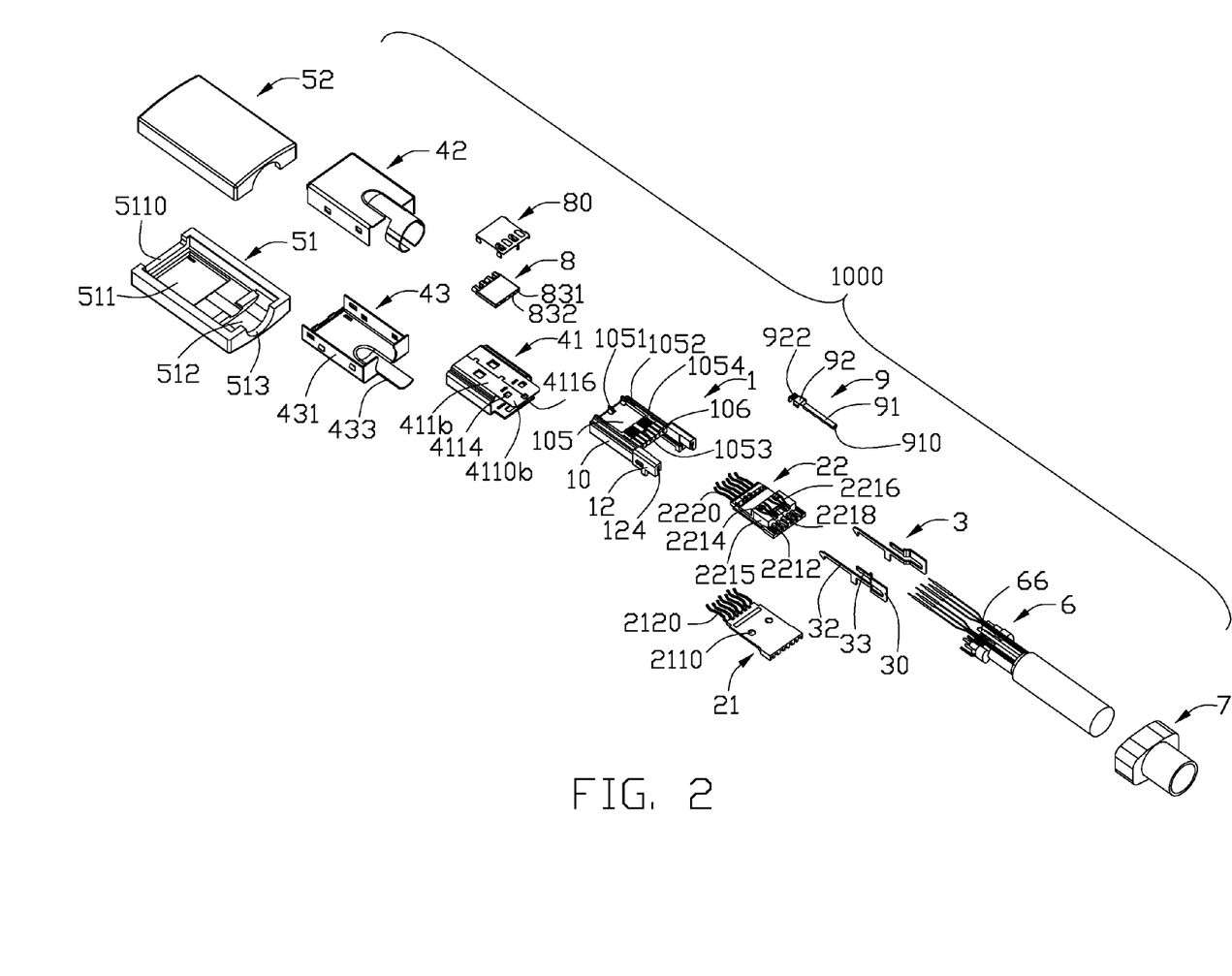
FIG. 2 is similar to FIG. 1, but viewed from another aspect.
Figure 3:
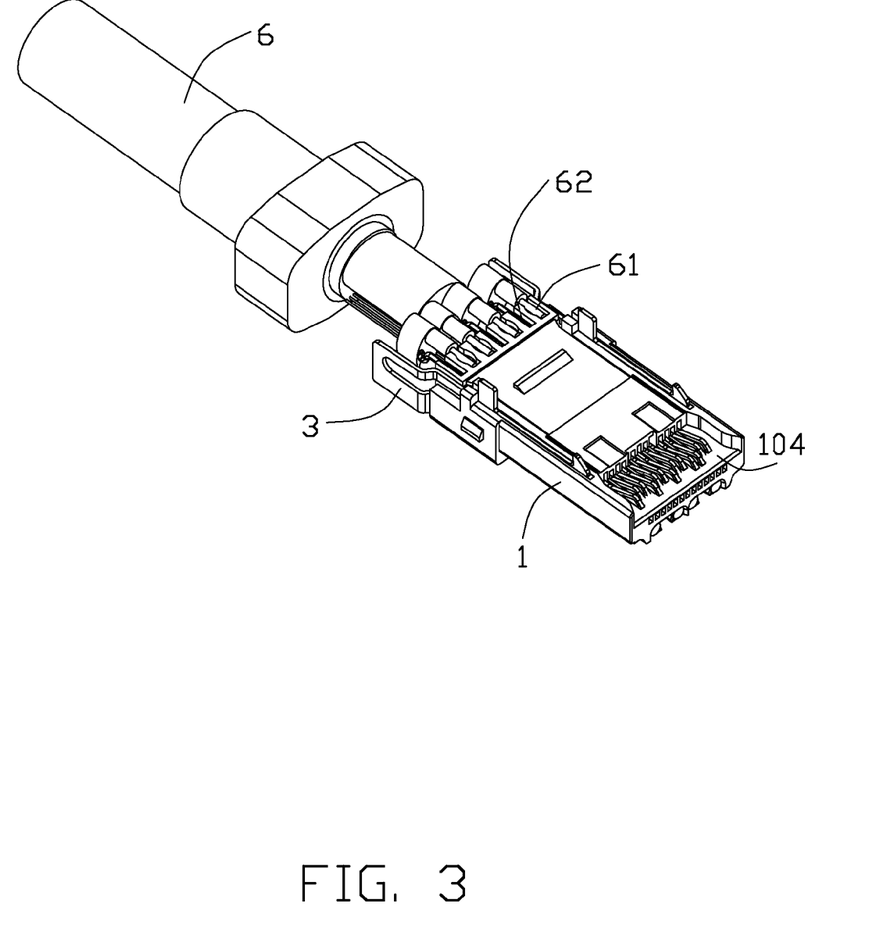
FIG. 3 is a partially assembled view of the cable assembly.
Figure 4:
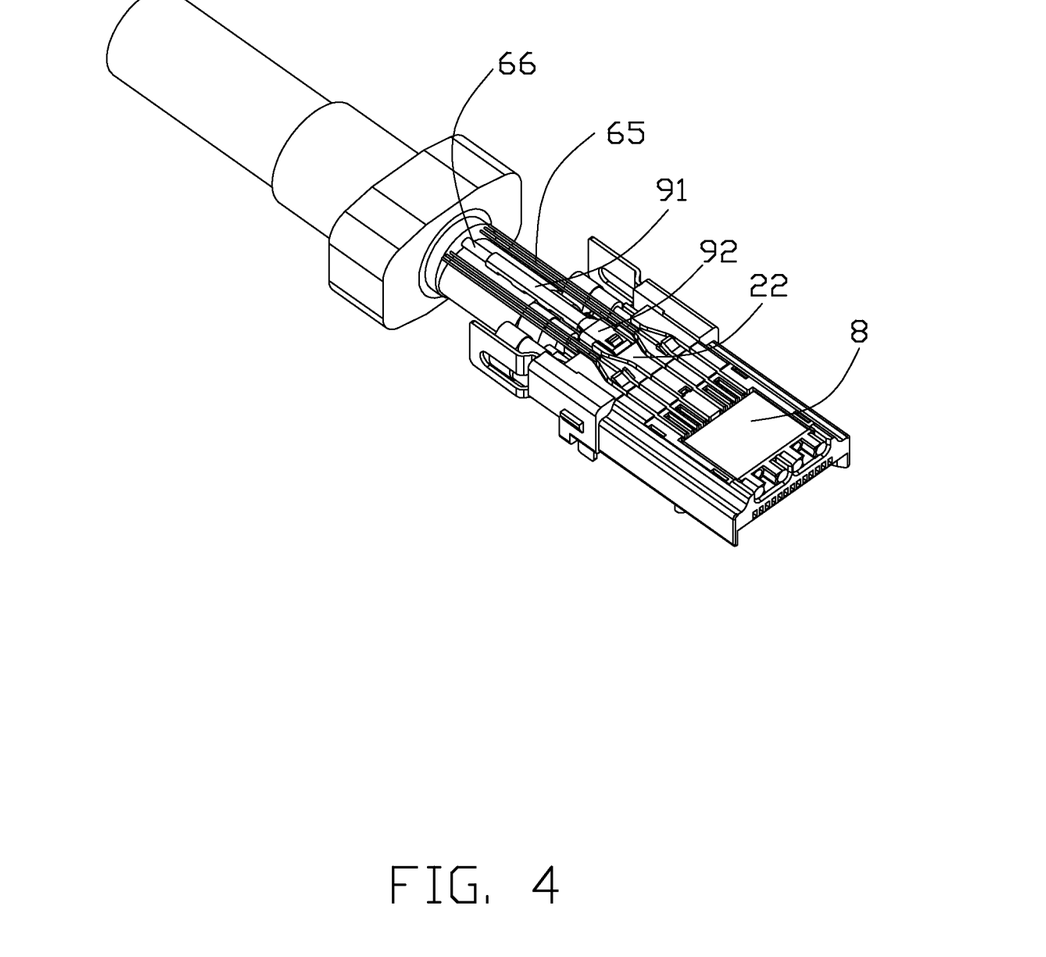
FIG. 4 is similar to FIG. 3, but viewed from other direction.
Figure 5:
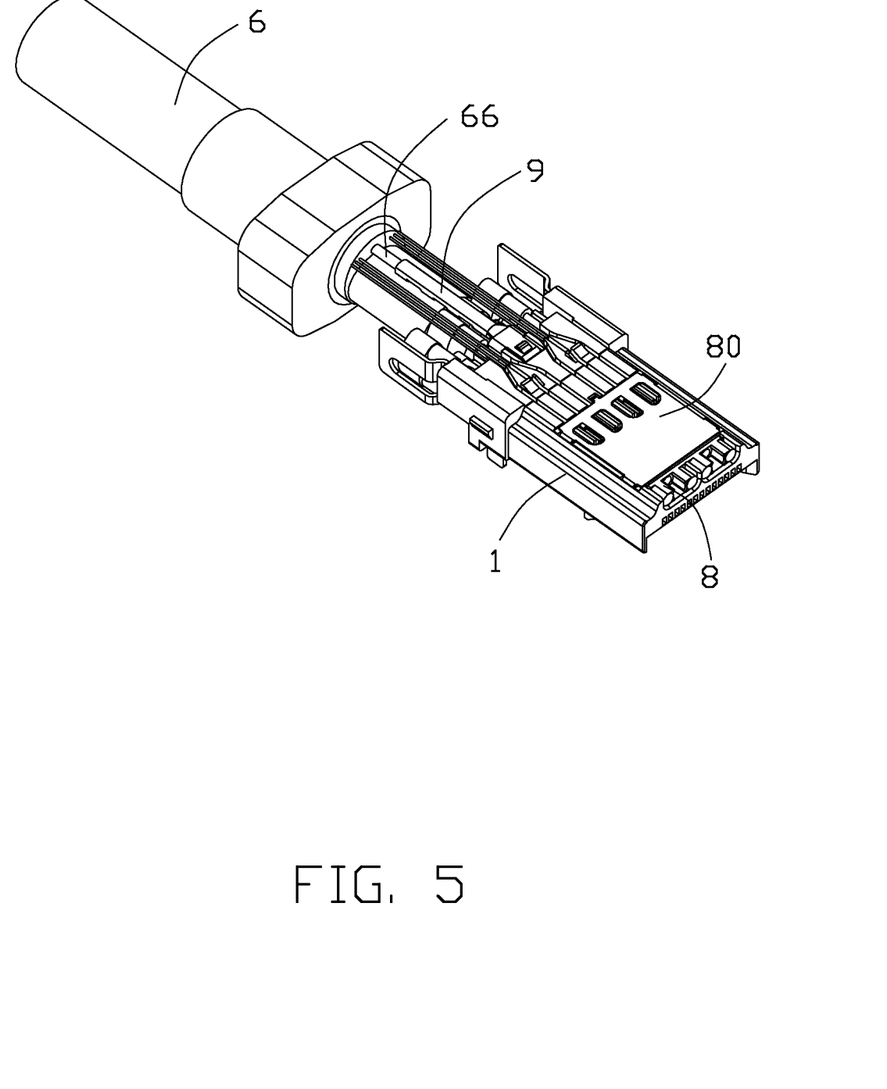
FIG. 5 is other partially assembled view of the cable assembly.
Figure 6:
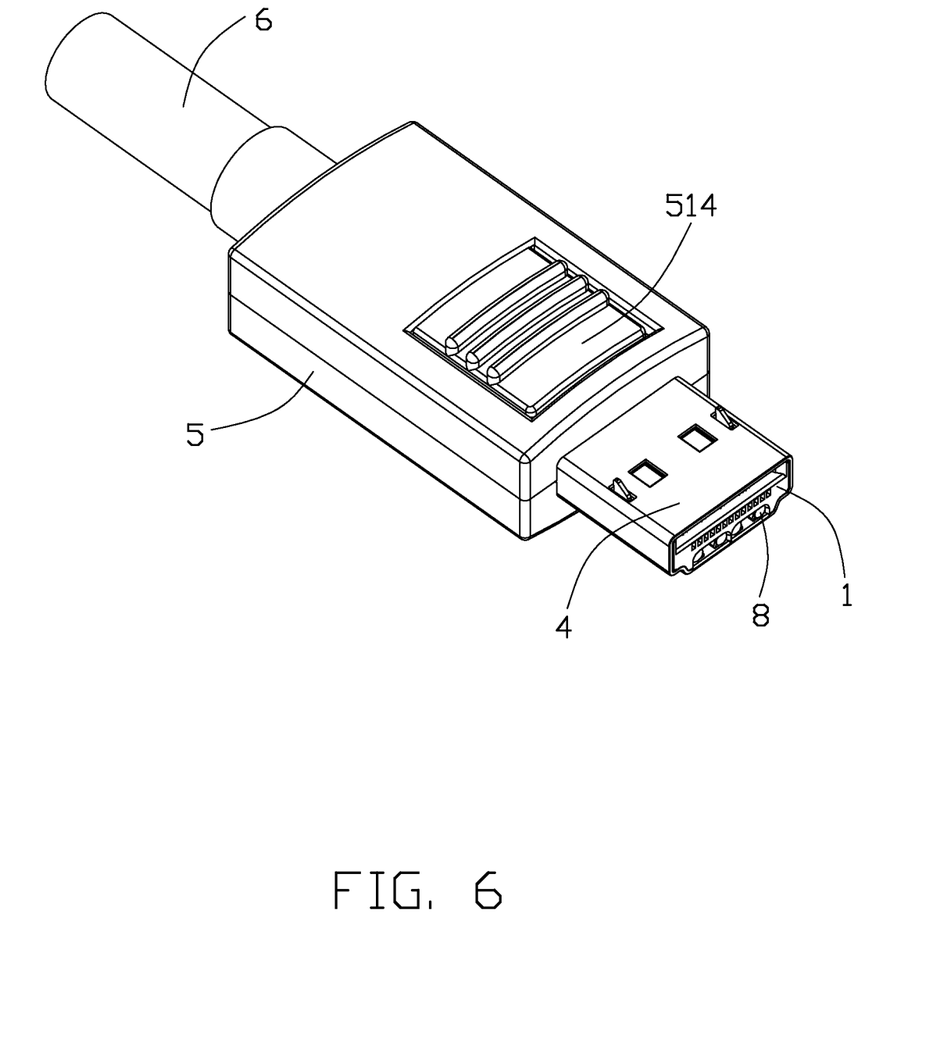
FIG. 6 is an assembled, perspective view of the cable assembly.

The insulative housing 1 includes a main portion 10 and two mounting arms 12 extending rearwardly from lateral sides of the main portion 10. A receiving space 102 is recessed forwardly from a middle segment of a rear edge of the main portion 10. A cavity 104 is recessed downwardly from a front segment of a top side of the main portion 10 and further communicates with the receiving space 102. A slot 101 is defined in each mounting arm 12 and partial of main portion 10 in front of the mounting arm 12. A positioning hole 124 is defined in a rear portion of each mounting arm 12. There is a groove 105 located in a front segment of a bottom side of the main portion 10. There are three stoppers 1051 formed in the front of the groove 105 and further spaced apart from each other along a transversal direction. There are several passages 106 defined in a back segment of the bottom side of the main portion 10. The passage 106 is much narrower than the corresponding groove 105 which is located forwardly. There are four first positioning holes 1052 are separated into two groups and arranged at lateral sides of the groove 105, respectively. In addition, there are a number of slots 1054 defined in a middle segment of the bottom side of the main portion 10. The slots 1054 are disposed behind and communicating with the groove 105. A second positioning hole 1053 is located in a center of the middle segment of the bottom side of the main portion 10.

The terminal module includes a first terminal module 21 and a second terminal module 22. The first terminal module 21 has an insulator 211 and a number of terminals 212 combined together by insert-molding process. The terminals 212 are divided into signal terminals and grounding terminals configured to be longer than the signal terminals. The terminals 212 have contacting portions 2120 disposed in front of an edge of the insulator 211 and tail portions which are accommodated in terminal slots 2112 defined in a back segment of the insulator 211. Two mounting holes 2110 are defined in a bottom side of the insulator 211 and a protruding portion 2111 are formed on a top side of the insulator 211.

Figure 8:
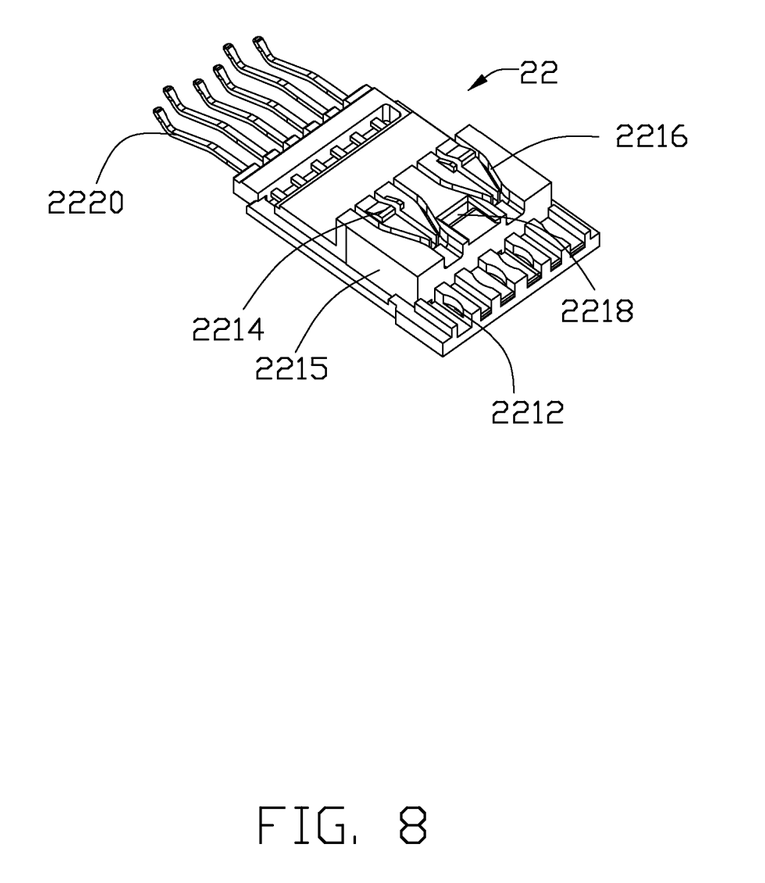
FIG. 8 is an enlarged view of a terminal module.

The second terminal module 22 has an insulator 221 and a number of terminals 222 combined together by insert-molding process. The terminals 222 are divided into signal terminals and grounding terminals configured to be longer than the signal terminals. The terminals 222 have contacting portions 2220 disposed in front of an edge of the insulator 221 and tail portions which are accommodated in terminal slots 2212 defined in a back segment of the insulator 221. Two mounting posts 2210 are formed on a top side of the insulator 221. There is a bump or platform 2215 formed at a bottom side of the insulator 221 and located in front of the terminal slots 2212. Two protrusions 2214 are formed on the bump 2215 and spaced apart from each other. There are a number of curved slots 2216 through the bump 2215 along a front-to-back direction. A retaining hole 2218 is located in a middle of the bump 2215.

The first terminal module 21 and the second terminal module 22 are stacked with each other, with the contacting portions merged into one row, while the tail portions separated into two distinct rows along an up-to-down direction. The mounting posts 2210 are inserted into the mounting holes 2110 so as to keep the first terminal module 21 and the second terminal module 22 together. The first terminal module 21 and the second terminal module 22 are assembled to the insulative housing 1, with front segments of the insulators 211, 221 inserted into the receiving space 102, and back segments of the insulators 211, 221 disposed between the two mounting arms 12.

Each latching member 3 includes a connecting arm 30, a latching arm 32 and a retention arm 33. The latching arm 32 and the retention arm 33 are spaced apart from each other and extend forwardly from the connecting arm 30. Each latching arm 32 has a hook 322 formed at a front end thereof and projects upwardly. There is also a tab 324 formed on a middle of the latching arm 32 and protrudes upwardly. The latching arm 32 and the retention arm 33 are located in a first vertical plane. The connecting arm 30 is located in a second vertical plane disposed outward of the first vertical plane.

The metallic shell 4 has a first shell 41, a second shell 42 and a third shell 43. The first shell 41 includes a first frame 411 to accommodate the main portion 10 therein. The first frame 411 has a top side 411a and a bottom side 411b connected with each other by two lateral sides. There are two through holes 4110 located in a front segment of a top side 411a to allow the hooks 322 of the latching arm 32 passing through. A first engaging portion 4110a projects backward from the top side 411a. There is a positioning hole 4112 defined in the first engaging portion 4110a to latch with the protruding portion 2111 of the first terminal module 21. A second engaging portion 4110b projects backward from the bottom side 411b of the first frame 411. There are two positioning holes 4114 defined in the second engaging portion 4110b to latch with the protruding portions 2214 of the second terminal module 22.

The second shell 42 includes a U-shaped main body 421 and a cable holder 423 integrated with the main body 421 and projecting backwardly. The third shell 43 includes an inverted U-shaped main portion 431 and a tail 433 extending rearward. The second shell 42 and the third shell 43 can be combined together along a vertical direction.

The external cover 5 includes an upper cover 51 and a bottom cover 52. The upper cover 51 has a first hollow 511 and a second hollow 512 disposed behind the first hollow 511. A rectangular shaped opening 5110 is located in the front portion of the upper cover 51, and the opening 5110 further communicates with the first hollow 511. A semicircular shaped outlet 513 is defined in the rear portion of the upper cover 51 and communicated with the second hollow 512. A deformable button 514 is integrally formed with the upper cover 51 and floatable along up-to-down direction to enter the first hollow 511 so as to actuate the tab 324 of the latching arm 32.

The bottom cover 52 is similar to the upper cover 51, and also has a first hollow 521 and a second hollow 522 disposed behind the first hollow 521. An opening 5210 is located in the front portion of the bottom cover 52, and the opening 5210 further communicates with the first hollow 521. A semicircular shaped outlet 523 is defined in the rear portion of the bottom cover 52 and communicated with the second hollow 522.

The cable 6 is a hybrid cable and includes a number of wire groups and fibers 65 enclosed in a jacket 60. Each wire group includes a pair of signal wires 61 and a grounding wire 62 associated with the pair of signal wires 62, and a shielding member 63 shrouding the pair of signal wires 61 and the grounding wire 62. The shielding member 63 is aluminum foil or other similar structure. In addition, the cable 6 further has at least one or group of strength member 66 enclosed within the jacket 60. The strength member 66 can be kevlar, nylon, and so on. The signal wires 61 and the grounding wires 62 are placed in the terminal slots 2112, 2212 and soldered to the tail portions of the terminals 212, 222. The strain relief 7 is molded over a front segment of the cable 6 and accommodated in the second hollows 512, 522.

The optical module 8 includes four first lenses 81 and two second lenses 81' combined with a lens retainer 83. The first lenses 81 are arranged in a row along the transversal direction. The four first lenses 81 are divided into two pairs and there is a second lenses 81' located between each pair of the first lenses 81. In addition, the first lenses 81 are more forward than the second lenses 81'. There are four first fiber holes 831 respectively aligning with the first lenses 81 and two second fiber holes 832 respectively aligning with the second lenses 81'. Both the first fiber holes 831 and the second fiber holes 832 are recessed forwardly from a back edge of the lens retainer 83. The fibers 65 are respectively inserted into the first fiber holes 831, second fiber holes 832 to optically couple with the first lens 81 and the second lenses 81'.

The cable assembly 1000 further comprises a cap member 80 mounted to the insulative housing 1 to prevent the optical module 8 falling off therefrom. The cap member 80 includes a plate-like body segment 801, four first engaging parts 802 extending upward from two lateral sides of the body segment 801, respectively, and a second engaging part 803 extending upward from a back side of the body segment 801. The cap member 80 further has a number of tabs 804 projecting upwardly from a back section of the body portion segment 801. The tabs 804 are spaced apart from each other along the transversal direction.

Figure 7:
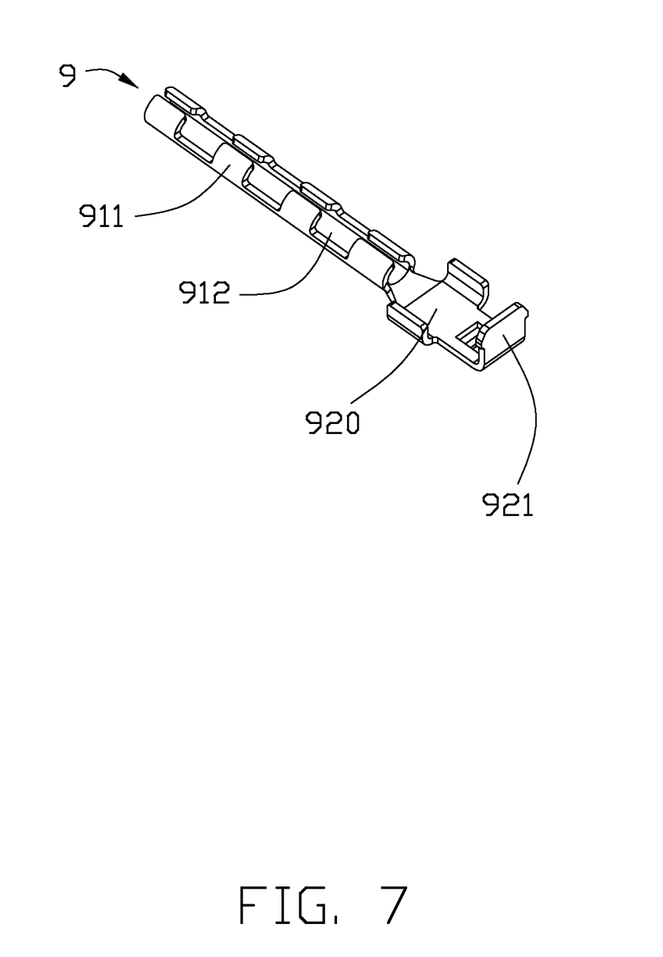
FIG. 7 is an enlarged view of an engagement member.

The anchoring member 9 includes a holding portion 91 and a locking portion 92 connected with the holding portion 91. The holding portion 91 defines a longitudinal hollow 910. The holding portion 91 has a plurality of gripping tabs 911 which are separated into several pairs and arranged along the longitudinal direction. Each pair has two gripping tabs 911 symmetrically arranged. There is a cutout 912 located between every two adjacent pairs of the gripping tabs 911 along the longitudinal direction. The locking portion 92 has a main part 920 connecting with the holding portion 91, a number of engaging part 921 extending upwardly from a front edge and lateral edges of the main part 920. In addition, there is a spring tab 922 extending downwardly from the main part 920.

The strength member 66 extending into the hollow 910 of the holding portion 91 and clamped by the gripping tabs 911. Furthermore, glue or adhesive material is applied to the hollow 910 to secure the strength member 66 and the holding portion 91.

The optical module 8 is mounted to the groove 105, and the fibers 65 backwardly extend through curved slots 2216 of the second terminal module 22. The locking portion 92 engaged with the second terminal module 22, with the engaging part 921 of the locking portion 92 locking into the retaining hole 2218 of the second terminal module 22. Furthermore, the spring tab 922 is engaged with a corresponding engaging hole 4116 defined in the second engaging portion 4110b of the first shell 41. In alternative embodiment, the terminals 212, 222 may be supported by or mounted to the insulative housing 1, and the insulative housing 1 and the insulators 211, 212 may be integrally together to form an insulative housing unit. The locking portion 92 is engaged with corresponding retaining slot in the insulative housing unit. It should be noted that the insulative housing unit can also be a one-piece structure, and the locking portion 92 may be engaged with a retaining slot in a back segment of the insulative housing unit.

The cap member 80 is assembled to the main portion 10 of the insulative housing 1 to shield the optical module 8. The number of tabs 804 are engaged with the slots 1054 of the main portion 10, the first engaging parts 802 are inserted into the first positioning holes 1052, and the second engaging parts 803 are inserted into the second positioning holes 1053.

The cable assembly 1000 is compatible with DiiVA (Digital Interactive Interface for Video & Audio) standard. Referring to FIGS. 1-2, within the cavity 104, along a left-to-right direction, there are thirteen terminals 212, 222 which are arranged in such manner: G-S-S-G-S-S-G-S-S-G-G-S-S. G represents grounding terminal, and S represent signal terminal There are three differential pairs consisted of six signal terminals located between grounding terminals. The differential pairs used for conveying video signals. And a pair of signal terminals disposed at the right side are used for audio signals.

When the cable assembly 1000 mates with the receptacle connector (not shown), the hook 322 of the latching arm 32 locks into the latching hole in a shell of the second receptacle connector, thus the cable assembly 1000 are reliably engaged with the receptacle connector. When detach the cable assembly 1000 from the receptacle connector, just press the deformable button 514 to actuate the tab 324 of the latching arm 32, and the latching arm 32 retreat into the slots 101. When the pressing force is withdrawn, the deformable button 514 restored to its original position, and the latching arms 32 also upwardly movement to their original place.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A cable assembly, comprising: an insulative housing; a terminal module assembled to the insulative housing, the terminal module including a plurality of terminals combined with an insulator; at least one lens supported by the insulative housing; a cable having a plurality of wires, a fiber and a strength member, the wires electrically connected to the terminals, the fiber optically coupled with the lens; and an anchoring member having a holding portion combined with the strength member and a locking portion engaged with the terminal module, wherein the holding portion has a plurality of gripping tabs clamping the strength member.

2. The cable assembly as recited in claim 1, wherein the holding portion defines a longitudinal hollow to accommodate the strength member.

3. The cable assembly as recited in claim 1, wherein the gripping tabs are divided into a number of pairs and each pair has two gripping tabs symmetrically arranged.

4. The cable assembly as recited in claim 2, wherein glue or adhesive material is applied to the hollow to secure the strength member and the holding portion.

5. The cable assembly as recited in claim 1, wherein the locking portion has a main part connecting with the holding portion and at least one engaging part extending upwardly from a front edge of the main part.

6. The cable assembly as recited in claim 5, wherein the engaging part of the locking portion locks into a retaining hole defined in the insulator of the terminal module.

7. The cable assembly as recited in claim 1, wherein the strength member is kevlar or nylon.

8. A cable assembly, comprising:
an insulative housing unit;
a plurality of terminals supported by the insulative housing unit;
an optical module mounted to the insulative housing unit, the optical module having a plurality of lenses;
a metallic shell shielding the insulative housing unit;
a cable having a plurality of wires, a plurality of fibers and a strength member, the wires electrically connected to the terminals, the fibers optically coupled with the lenses; and
an anchoring member having a holding portion combined with the strength member and a locking portion engaged with a back segment of the insulative housing unit; wherein
the insulative housing unit includes an insulative housing and an insulator mounted to the insulative housing, the insulative housing defines a groove accommodating the optical module and the insulator combined with the terminals to form a terminal module: wherein
there is a bump formed at a bottom side of the insulator and a retaining hole located in the bump, and the locking portion has at least one engaging part locking into the retaininn hole.

9. The cable assembly as recited in claim 8, wherein there are a plurality of slots through the bump along a front-to-back direction, and the fibers pass through the slots, respectively.

10. The cable assembly as recited in claim 9, wherein there is a protrusion formed on the bump and latching with a corresponding positioning hole defined in the metallic shell.

11. The cable assembly as recited in claim 8, wherein there is an engaging hole defined in the metallic shell, and the locking portion has a spring tab engaged with the engaging hole defined in the metallic shell.

12. The cable assembly as recited in claim 11, wherein the locking portion has a main part connecting with the holding portion, and the engaging part and the spring tab formed on the main part.

13. The cable assembly as recited in claim 12, wherein the engaging part and the spring tab are disposed at opposite sides of the main part.

14. The cable assembly as recited in claim 8, wherein the lenses include at least one first lens and at least one second lens combined with a lens retainer, and the first lens is disposed forward with regarding to the second lens.

15. A cable connector assembly comprising:
an insulative housing defining a plurality of passageways arranged in one row;
a pair of terminal modules stacked with each other, each of said terminal modules including a plurality of contacts integrally formed in an insulator in one row under condition that rear tail sections of the contacts of said pair of terminal modules are arranged in two rows while front contacting sections of the contacts of said pair of terminal modules are arranged in one row to be inserted into the corresponding passageway and commonly exposed upon a mating face of the housing;
the housing defining a receiving cavity opposite to the mating face;

an optical module received in the receiving cavity with a lens forwardly communicating with an exterior; and a cable including a plurality of wires mechanically and electrically connected to tail sections of the corresponding contacts, and a plurality of optical fibers optically connected to the optical module; wherein the insulator of one of the terminal modules being equipped with bump structures with therein slots through which corresponding optical fibers extend in a front-to-back direction.

16. The cable connector assembly as claimed in claim 15, wherein the cable is equipped with a strength member for reinforcement, and a strong anchoring member is linked between the strength member and either the housing or one of the terminal modules.

17. The cable connector assembly as claimed in claim 16, wherein said anchoring member is linked to the terminal module having bump structures thereon.

* * * * *